(12) United States Patent
Snider et al.

(10) Patent No.: US 8,896,431 B2
(45) Date of Patent: Nov. 25, 2014

(54) APPARATUS AND METHOD FOR COMPROMISED VEHICLE TRACKING

(75) Inventors: James Snider, Kildeer, IL (US); Robert F. D'Avello, Lake Zurich, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 416 days.

(21) Appl. No.: 12/643,498

(22) Filed: Dec. 21, 2009

(65) Prior Publication Data

US 2011/0148610 A1 Jun. 23, 2011

(51) Int. Cl.
| | | |
|---|---|---|
| B60R 25/10 | (2013.01) | |
| B60R 25/00 | (2013.01) | |
| H04W 4/22 | (2009.01) | |
| H04W 12/02 | (2009.01) | |
| H04W 76/00 | (2009.01) | |
| H04W 88/02 | (2009.01) | |
| H04W 12/12 | (2009.01) | |

(52) U.S. Cl.
CPC ............ B60R 25/00 (2013.01); B06R 25/2072 (2013.01); *H04W 4/22* (2013.01); *H04W 12/02* (2013.01); *H04W 76/007* (2013.01); *H04W 88/02* (2013.01); *H04W 12/12* (2013.01)
USPC .................. 340/426.22; 340/539.13; 342/457

(58) Field of Classification Search
CPC .. B60R 25/33; B60R 25/102; B60R 25/1004; B60R 25/1025; B60R 25/00; B60R 25/1003; G08G 1/205; G08G 1/0962; G08G 25/009; G08G 13/1436; G01S 5/0027; G01S 19/42; H04W 4/021

USPC ........................ 340/26.1, 427–430, 988–994, 340/539.1–539.22, 426.1, 426.11–426.22; 342/457

See application file for complete search history.

(56) References Cited

U.S. PATENT DOCUMENTS

| | | | | |
|---|---|---|---|---|
| 4,001,828 | A | * | 1/1977 | Culpepper .................... 342/446 |
| 4,849,735 | A | * | 7/1989 | Kirtley et al. .............. 340/539.1 |
| 5,208,756 | A | * | 5/1993 | Song .......................... 455/456.3 |
| 5,572,201 | A | * | 11/1996 | Graham et al. ............... 340/902 |
| 5,895,436 | A | | 4/1999 | Savoie et al. |
| 6,330,438 | B1 | | 12/2001 | McClelland et al. |
| 6,803,861 | B2 | | 10/2004 | Flick |
| 7,348,877 | B2 | * | 3/2008 | Chen et al. .................... 340/438 |

(Continued)

FOREIGN PATENT DOCUMENTS

| | | |
|---|---|---|
| DE | 10009488 A1 | 11/2000 |
| DE | 102004048668 A1 * | 4/2006 |

(Continued)

OTHER PUBLICATIONS

M. Mouly; M-B Pautet, "Mobility and Security Management" GSM System For Mobile Communications, Jan. 1, 1993, pp. 432-498, Europe Media, Lassay-les-Chateaux, France.

(Continued)

*Primary Examiner* — Mohammad Ghayour
*Assistant Examiner* — Nay Tun

(57) ABSTRACT

Before a vehicle is parked, a signal is received from at least one of a base station and a location determination system. It is determined when the signal fails to meet at least one predetermined criteria. When the signal fails to meet the at least one predetermined criteria, a warning message is formed and presented to an operator of the vehicle.

17 Claims, 3 Drawing Sheets

(56) References Cited

U.S. PATENT DOCUMENTS

| | | |
|---|---|---|
| 2002/0014978 A1 | 2/2002 | Flick |
| 2002/0163906 A1 | 11/2002 | Diachina et al. |
| 2003/0164775 A1* | 9/2003 | Hutchison et al. ............ 340/902 |
| 2003/0222813 A1 | 12/2003 | Boulay et al. |
| 2004/0005858 A1 | 1/2004 | Cervinka et al. |
| 2004/0075539 A1 | 4/2004 | Savoie et al. |
| 2005/0088318 A1 | 4/2005 | Liu et al. |
| 2005/0090952 A1 | 4/2005 | Boulay et al. |
| 2006/0007039 A1 | 1/2006 | Duvall |
| 2006/0092007 A1* | 5/2006 | Cantu ........................... 340/442 |
| 2006/0111835 A1* | 5/2006 | Baker et al. ................... 701/207 |
| 2006/0267744 A1 | 11/2006 | Baumgartner et al. |
| 2007/0049323 A1 | 3/2007 | Wang et al. |
| 2007/0079376 A1 | 4/2007 | Jean-Marc et al. |
| 2007/0200688 A1 | 8/2007 | Tang et al. |
| 2008/0186932 A1 | 8/2008 | Do et al. |
| 2008/0311870 A1* | 12/2008 | Walley et al. ............... 455/186.1 |
| 2009/0228199 A1* | 9/2009 | Bhogal et al. ................. 701/201 |

FOREIGN PATENT DOCUMENTS

| | | | |
|---|---|---|---|
| EP | 0167442 A2 | | 1/1986 |
| EP | 1362753 A1 | | 11/2003 |
| EP | 1514444 A1 | | 3/2005 |
| EP | 1809057 A1 | | 7/2007 |
| EP | 2003818 A1 | | 12/2008 |
| EP | 1593564 A1 | | 11/2009 |
| EP | 2124428 A1 | | 11/2009 |
| GB | 2296843 A | | 7/1996 |
| GB | 2317418 A | | 3/1998 |
| GB | 2407455 A | | 4/2005 |
| GB | 2408371 A | * | 5/2005 |
| GB | 2435987 A | | 9/2007 |
| GB | 2445046 A | | 6/2008 |
| GB | 2457102 A | | 8/2009 |
| WO | 95/33214 A1 | | 12/1995 |
| WO | 96/04155 A1 | | 2/1996 |
| WO | 00/21053 A1 | | 4/2000 |
| WO | 01/32481 A1 | | 5/2001 |
| WO | WO01/31797 A1 | | 5/2001 |
| WO | 03/103322 A1 | | 12/2003 |
| WO | 2005/112321 A1 | | 11/2005 |
| WO | 2006/092737 A2 | | 9/2006 |
| WO | 2007/019814 A1 | | 2/2007 |
| WO | 2008/111001 A2 | | 9/2008 |

OTHER PUBLICATIONS

International Search Report dated Apr. 12, 2011, from corresponding International Patent Application No. PCT/US2010/060760.
International Search Report dated Mar. 10, 2011, from corresponding International Patent Application No. PCT/US2010/060811.
International Search Report dated Feb. 28, 2011, from corresponding International Patent Application No. PCT/US2010/060532.
International Search Report dated Mar. 1, 2011, from corresponding International Patent Application No. PCT/US2010/060527.
International Search Report dated Jun. 17, 2011, from corresponding International Patent Application No. PCT/US2010/060787.
International Search Report dated Jun. 1, 2011, from corresponding International Patent Application No. PCT/US2010/060723.
International Search Report dated Jun. 28, 2011, from corresponding International Patent Application No. PCT/US2010/060795.
International Search Report dated May 24, 2011, from corresponding International Patent Application No. PCT/US2010/060518.
International Search Report dated Apr. 15, 2011, from corresponding International Patent Application No. PCT/US2010/060773.
International Search Report dated Mar. 1, 2011, from corresponding International Patent Application No. PCT/US2010/060750.
International Search Report dated Mar. 28, 2011, from corresponding International Patent Application No. PCT/US2010/060803.
International Search Report dated May 13, 2011, from corresponding International Patent Application No. PCT/US2010/060675.

* cited by examiner

APPARATUS AND METHOD FOR COMPROMISED VEHICLE TRACKING

CROSS REFERENCES TO RELATED APPLICATIONS

"Apparatus and Method of Detecting Jamming of Communications" having U.S. Ser. No. 12/643,049

"Apparatus and Method for Broadcasting the Detection of RF Jammer Presence" having U.S. Ser. No. 12/643,825

Apparatus and Method for Detecting a Cloned Base Station" having U.S. Ser. No. 12/643,081

"Apparatus and Method for detecting Communication Interference" having U.S. Ser. No. 12/643,068

"Apparatus and Method for Detecting a Cloned Base Station" having U.S. Ser. No. 12/643,353

"Apparatus and Method for Determining an Invalid Base Station" having U.S. Ser. No. 12/643,463

"Apparatus and Method for Determining Vehicle Location" having U.S. Ser. No. 12/643,412

"Apparatus and Method for Maintaining Communication with a Stolen Vehicle Tracking Device" having U.S. Ser. No. 12/643,841

"Apparatus and Method for Reducing False Alarms in Stolen Vehicle Tracking" having U.S. Ser. No. 12/643,889

"Apparatus and Method for Tracking Stolen Vehicles" having U.S. Ser. No. 12/643,862

"Apparatus and Method for Maintaining Communications with a Vehicle in the Presence of Jamming" having U.S. Ser. No. 12/643,850 all of which being filed on the same date as the present application and both of which having their contents incorporated herein by reference in their entireties.

FIELD OF THE INVENTION

The field of the invention relates to communications between various entities and, more specifically to the detection of jamming or attempted jamming of these communications.

BACKGROUND

Vehicles are equipped with various types of communication systems that provide or facilitate various types of functions. For instance, a vehicle may be equipped with a global positioning satellite (GPS) system that provides for locating the vehicle and providing information concerning the location of the vehicle to a user. Vehicle security systems are also employed in many vehicles to protect the vehicle and its contents from theft or other criminal activity. For example, a vehicular security system may be configured to communicate with some outside entity (e.g., a police or security center) and when an attempt is made to break into a vehicle, the vehicular security system may transmit messages to the outside entity where appropriate action may be taken to prevent or stop the break in. Some jurisdictions even require the use of security systems in vehicles because of the high number of vehicle break-ins or thefts in these areas.

If a vehicle is stolen, stolen vehicle tracking (SVT) applications attempt to track and sometimes recover the stolen vehicle. To give one example, some SVT applications rely upon a GPS system to pinpoint the location of the vehicle and a Global System for Mobile communications (GSM) cellular network to report the incident to a service provider via Short Message Service (SMS) or General Packet Radio Service (GPRS) data connections.

Potential thieves have sometimes attempted to jam the receiver hardware located at the vehicle by employing devices that create a strong wide-band signal in the receive band and thereby block the GPS satellite from being received at the vehicle and/or to block GSM network signals that are sent from the cellular base station to the vehicle. Previous attempts at detecting such jamming and/or attempted jamming and reporting these actions to a security center have generally been unsuccessful and/or expensive to accomplish.

Additionally, current systems do not provide adequate warnings (or any warnings at all) in real time or close to real time so that the driver has enough time to take a corrective action. In these situations, the driver is informed too late to take any corrective action and the vehicle and/or its contents are stolen.

Figure 1:
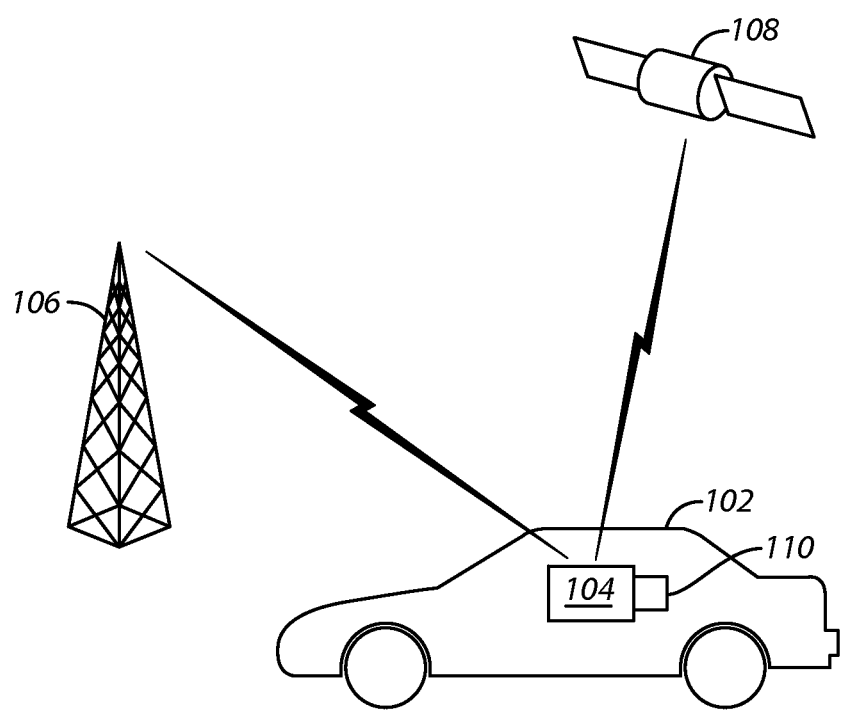
FIG. 1 comprises a block diagram of a system for alerting a user of a vehicle of the potential compromised/impaired performance of a tracking or security system according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided where a user of a vehicle is presented with a warning when a determination is made that a vehicle tracking system or security system may be potentially compromised or impaired (e.g., communication with an external vehicle tracking or navigation system are jammed). The approaches provided herein allow a user to avoid having their vehicle tracking and/or security system become compromised due to criminal or other activity. These approaches are easy to implement, easy to use, can be easily retrofitted into existing vehicles and systems, and are accurate at determining potentially compromising events so that the user can take preventative or corrective actions to avoid loss of their vehicle and/or its contents.

In many of these embodiments, before a vehicle is parked, a signal is received from at least one of a base station or a location determination system. It is determined when the signal fails to meet at least one predetermined criteria. When the signal fails to meet the at least one predetermined criteria, an emergency or warning message is formed (and or an action determined) and presented to an operator of the vehicle.

The determination as to whether the signal fails to meet at least one predetermined criteria may be accomplished according to a variety of different approaches. For example, it may be determined when the received signal strength is below a predetermined level. In other examples, it may be determined when a received signal quality fails to meet a predetermined quality level. In still another example, the existence of interference (e.g., at or above a predetermined level) in the received signal may be determined.

The signal may be conducted over a wide variety of frequency ranges over a variety of different systems operating according to various protocols. For example, the signal may be made in the Global System for Mobile Communications (GSM) band or the Global Positioning Satellite (GPS) band. Other examples of frequency ranges and types of systems are possible.

In other examples, a user may be instructed to move the vehicle to a second location with an improved signal quality. For example, the driver may drive to a location that is known to have a good quality of service. In another example, the driver may be presented with a list of possible destinations of known good signal quality and after selecting an appropriate destination can proceed to this destination of choice. In still other examples, the driver may not be presented with a particular destination but may drive onward until the detected signal quality improves to an acceptable level.

In other aspects, the emergency message can be constructed according to a wide variety of formats and present various content to the user. For example, the emergency message may be an audio message and/or a visual message. When the emergency message is an audio message, it can be presented on any combination of audio speakers, sirens, or other audio presentation devices. If the message is visual, it may be presented by light emitting diodes (LEDs), conventional lights, any visual display screen (e.g., touches screens, liquid crystal displays and so forth).

If display screens are used, a warning message may be displayed. In addition and as mentioned, other information such as destinations of known good signal quality may be presented to the driver. In still another example, a map may be presented to the driver showing the driver the route to the destination. In this respect, an external navigation system (e.g., GPS satellite system) may supply information that shows, for example, the vehicles progress towards the selected destination. Other examples of audio presentation devices, visual presentation devices, and informational content are possible.

In others of these embodiments, the signal is monitored after the vehicle is parked (or after the occurrence of some other predetermined event). When the signal fails to meet the at last one predetermined criteria, an alert is transmitted to an external entity. The external entity may be an emergency center (where authorized individuals monitor the security of a vehicle, for example, when the owner has subscribed to a security service) or the police (or other law enforcement agency) to name two examples. As mentioned above, the alert or warning message can assume a variety of different forms. The alert or warning message could take the form of flashing the vehicle's headlights, honking the horn, or activating a siren such as is used in a traditional car alarm. For example, the alert or warning message can be a visual alert or an audio alert. The alert or warning message may be transmitted to the external entity via any type of communication media over any type of network and according to any type of protocol. For example, it may be transmitted over a cellular network operating according to the GSM protocol.

In others of these embodiments, an apparatus for detecting a theft or attempted theft of a vehicle includes an antenna, an interface and a controller. The antenna is configured to receive a signal from at least one of a base station or a location determination system before the vehicle is parked. The interface is coupled to the antenna and a presentation device.

The controller is coupled to the interface and is configured to determine when the signal from the location determination system received at the antenna fails to meet at least one predetermined criteria. When the signal fails to meet the at least one predetermined criteria, an emergency message is formed and presented to an operator of the vehicle via the presentation device. The presentation device may be any combination of audio presentation device (e.g., audio speakers, sirens, or other audio presentation devices) or visual presentation device (e.g., light emitting diodes (LEDs), conventional lights, any visual display screen (e.g., touch screens, liquid crystal displays and so forth)). Other examples of presentation devices are possible.

Referring now to FIG. 1, one example of a system for determining and warning a user/driver when a security/tracking system is compromised/impaired or potentially compromised/impaired is described. A vehicle 102 includes a communication device 104. The communication device 104 is disposed anywhere in or at the vehicle and communicates with a base station 106 and an external navigation system 108. The communication device 104 is coupled to or incorporates a presentation device 110.

The communication device 104 may be, in one example, a programmed electronic device that determines the location of the vehicle 102 from signals received from the navigation system 108 and/or the base station 106 and determines if tracking and/or security is potentially compromised based upon the analysis of received signals. Alternatively, another separate device may be used to determine the location of the vehicle and this separate device may communicate with the communication device 104. The location determination system 108 may be a GPS satellite or satellite system, in one example. Although many of the examples described herein examine the signal quality of the signals received from the external navigation system, it will be appreciated that these approaches may also be applied to other types of signals such as signals received from cellular networks to mention one example. Thus, the user may be warned (in one example) that their cellular communications are being compromised and can take appropriate action.

It will be understood that many of the approaches described herein are described as being executed by devices that are at least partially disposed at or within a vehicle. However, it will be appreciated that the approaches described herein are not limited to devices that can be disposed at or within vehicles, but can be used with devices that are disposed at any location such as within homes, businesses, or even with individuals that are not within or associated with a vehicle.

The vehicle 102 may be any type of vehicle such as a car, truck, bus, airplane, ship, to name a few examples. The communication device 104 is any type of communication device that communicates with entities outside the vehicle 102 using any type of communication technology or protocol. For example, the communication device 104 may be or may incorporate a cellular phone, transponder, radio, or some combination of these or other devices.

The presentation device 110 may be any combination of audio presentation device (e.g., audio speakers, sirens, or other audio presentation devices) or visual presentation device (e.g., light emitting diodes (LEDs), conventional lights, any visual display screen (e.g., touch screens, liquid crystal displays and so forth)). Other examples of presentation devices are possible.

As mentioned, the presentation device 110 may be a separate device (or devices) that are coupled (e.g., via a wired or wireless connection) to the communication device 104. In other examples, the presentation device 110 is incorporated into the same housing of the communication device 104. In this respect, space savings may be achieved and, in one example, an advantageous form factor (of the combined communication device and presentation device) is presented to a user.

When the emergency message is an audio message, various types and levels of tones, and spoken messages (e.g., such as "You are entering an area of poor service. This may indicate potential tampering with your tracking system. Please consider moving your vehicle to an area of better service") with varying content may be presented to the user/driver. If the message is visual, various visual signals may be presented to the driver. For example, if LEDs or conventional lights are used, these may be, for instance, flashed in a pattern or with no particular pattern to indicate a warning. If display screens are used as all or part of the presentation device 110, a warning message may be displayed. In addition and as mentioned, other information such as destinations of known good signal quality may be presented to the driver. In still another example, a map may be presented to the driver showing the driver the route to a selected or potential destination of known, acceptable signal quality. In this respect, the external navigation system 108 may supply information that indicates, for example, the progress of the vehicle 102 towards the selected destination. Other examples of audio presentation devices, visual presentation devices, and informational content/format that are presented to the user/driver are possible.

In one example of the operation of the system of FIG. 1, before the vehicle 102 is parked, a signal is received from at least one of the base station 106 and the location determination system 108. The determination as to whether the vehicle is parked may be made by analyzing whether the vehicle is moving (e.g., via a variety of sensors that determine vehicle movement). In another example, the determination as to whether the vehicle is parked may be made by determining whether the key has been turned to start the vehicle. In other examples, no determination is made as to whether the vehicle is parked.

It is then determined when the signal fails to meet at least one predetermined criteria. Again, the signal may be from the base station 106 and/or the navigation system 108. When the signal fails to meet the at least one predetermined criteria, an emergency message is formed and presented to an operator of the vehicle 102. The failure of the signal to meet the predetermined criteria may indicate that an attempt at signal jamming is being made, other types of interference is occurring, or a cloned base station is in use to name a few examples. In these cases, the user/driver is warned with enough time to enable the user/driver to re-deploy the vehicle so that potential criminal assault of the vehicle can be avoided.

The determination as to whether the signal fails to meet at least one predetermined criteria may be accomplished according to a variety of different approaches. For example, in the case of GSM signals received from a cellular base station it may be determined when the received signal strength of signals received by the device 104 is below the reference sensitivity of the GSM cellular modem. For example, a signal strength may be reported to be less than −102 dbm at the input of the receiver. Other examples are possible. Even though the signal quality may be acceptable for this condition, if a large vehicle were to park next to the vehicle 102, it could potentially block the signal, lowering the level further and creating a poor signal condition. In other examples, it may be determined when a received signal quality of signals received by the device 104 fails to meet 2.4% Class II Bit Error rate (BER) or has an Rx Qual rating below approximately 4. Other examples are possible.

In still another example, the existence of interference in or jamming of the received signal may be determined. For example, as described in co-pending application entitled "Apparatus and Method of Detecting Jamming of Communications" having U.S. Ser. No. 12/643,049 and filed on the same date as the present application, a first rate of rise of a signal strength indicator associated with a first communication channel is monitored and a second rate of rise of a signal quality indicator associated with a first communication channel is also monitored. When at least one of the first rate rises at a rate greater than a first predetermined threshold rate or the second rate rises at a rate that is greater than a second predetermined threshold rate, jamming is determined to be occurring.

In another example of jamming detection and as described in co-pending application entitled "Apparatus and Method for detecting Communication Interference" having U.S. Ser. No. 12/643,068 and filed on the same date as the present application, location determination signals are received and a location of interest is determined from the location determination signals. Communication service is established and synchronized with a known, valid base station via a first communication channel. The value of a signal strength indicator associated with the first communication channel is monitored. When the value of the signal strength indicator falls below a threshold level, a warning message is transmitted to the known, valid base station before synchronization of the communication service is lost with the known, valid base station.

Various actions can be taken once the signal fails to meet the predetermined criteria. As mentioned, a warning message can be presented to the user. In another example, a warning may be transmitted to an emergency reporting center or the police (or some other law enforcement agency). The emergency reporting center is coupled to the base station 106. For example, this warning message may be transmitted over a GSM network. In other examples, other frequencies and/or other types of networks in addition to or instead of the GSM network can be used to transmit the warning message (and/or transmit or receive other communications). For example, warning messages may be transmitted at FM Radio Data System (RDS) frequencies, over Local Area Networks such as WiFi networks, over infrared (IR) networks, Bluetooth (BT) networks, to "amber alert" stations (e.g., using the Emergency Alert System (EAS) or Emergency Broadcast System (EBS)), over Worldwide Interoperability for Microwave Access (WiMAX) networks, over Code Division Multiple Access/Integrated Digital Enhanced Network (CDMA/iDEN) systems, and/or over Advanced Mobile Phone System (AMPS) networks. In addition, Morse code (or some other coding approach) may be transmitted using the horn and/or headlights of the vehicle 102 (or some other device in the vehicle). In still other examples, a short messaging service (SMS) cell broadcast is made once jamming is detected. Other examples are possible.

Broadcast FM RDS uses a sub-carrier to communicate digital information to the user's radio and to the user. The information for the user is text, such as the station call sign, and is usually presented to the user on the display of the car radio. In the present approaches, RDS may be used to carry a warning message would be to have the SVT unit transmit an RDS message on one or more broadcast FM channels with a text message such as "Help! Stolen Car: silver Chevy license 997 KLM". This message would be received in the vicinity of the stolen vehicle and could be seen by drivers whose cars are in the vicinity of the stolen vehicle. Even though nearby drivers are listening to a standard broadcasting station on the same frequency, the signal from the SVT unit would be received due to its higher signal strength at the receiver due to the small separation distance. One of these drivers could then make a call to the police or some other authority. Due to the short range nature of the communications, the stolen vehicle would be in the vicinity of this person's car.

A security beacon can be activated once the signal fails to meet the predetermined criteria. For example, a security beacon such as those manufactured by the LoJack Corporation can be used. The security beacon transmits signals that can be detected and used to locate the vehicle 102. The security beacon can be used in addition to or in place of the communications (e.g., warning messages) that are transmitted, for example, over GSM systems.

In another example, the communication device 104 can transmit a periodic (or non-periodic) "pinging" signal to a server (e.g., a schema validation tool (SVT) server). If the server detects no pinging signal, it may assume that the vehicle is stolen. The server, in this example, is external to the vehicle 102.

Any number of antennas may be used by the communication device 104. In one example two antennas are used and one antenna is used to transmit signals and the other is used to receive signals. In other examples, multiple TX and RX antennas can be used with some of the antennas being used as backup antennas. If the path loss abruptly changes, then the device can switch antennas. In one aspect, when jamming is occurring (or detected to be occurring) then the device can switch antennas and attempt to communicate on the backup antenna or backup antennas. In still other examples, a single antenna is used.

Figure 2:
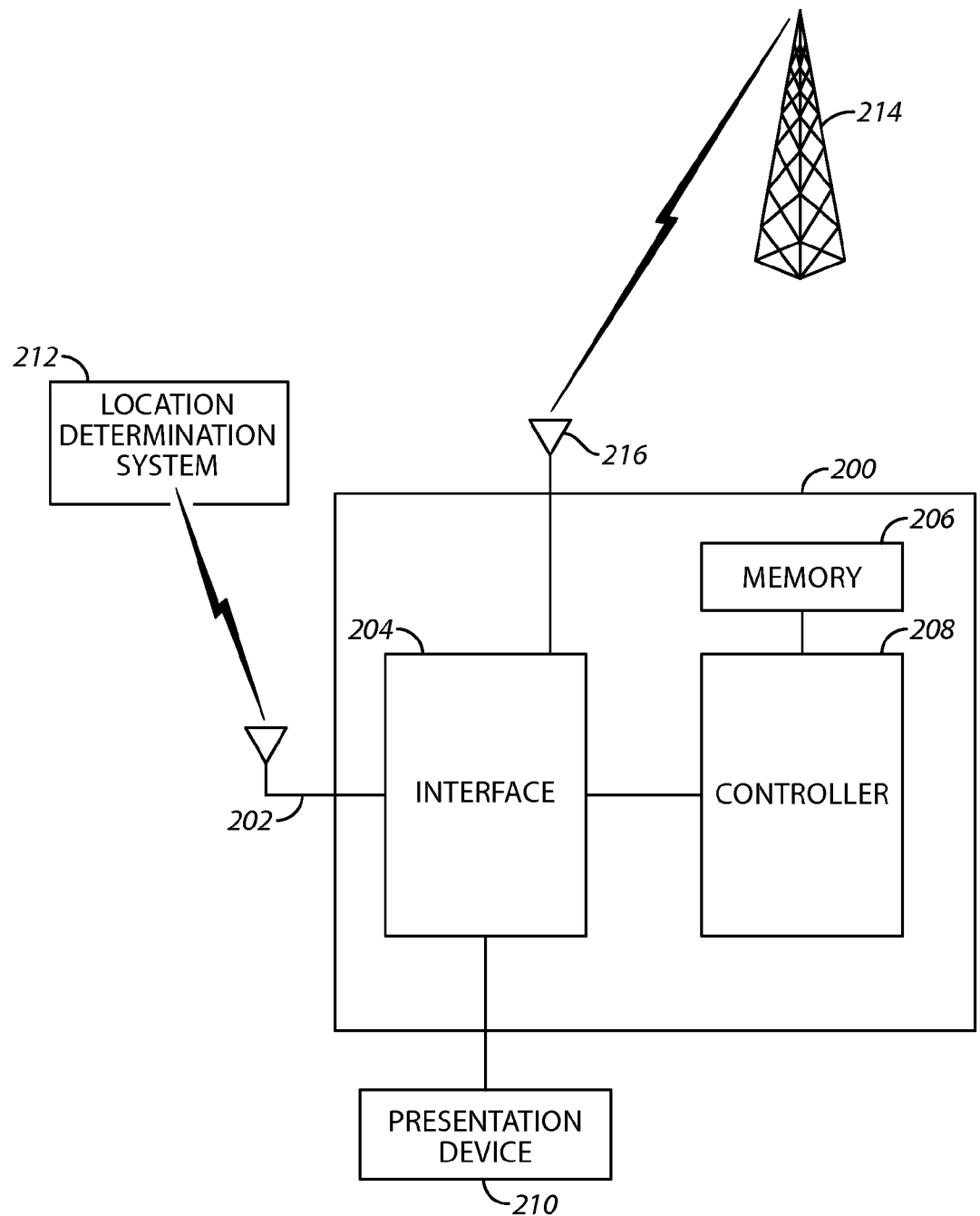
FIG. 2 comprises a block diagram of an apparatus for alerting a user of a vehicle of the potential compromised/impaired performance of a tracking or security system according to various embodiments of the present invention.

Referring now to FIG. 2, an apparatus 200 for detecting a theft or attempted theft of a vehicle includes an antenna 202, an interface 204, a memory 206, a controller 208, a presentation device 210, and an antenna 216. The antenna 202 is configured to receive a signal from a location determination system before the vehicle is parked. The antenna 216 is configured for communicating with a base station 214. The interface 204 is coupled to the antenna 202, the presentation device 210, and the controller 208. The interface 204 includes the receivers and transmitters for communicating with the base station 214 and the location determination system 212. The memory 206 stores computer instructions that can be used to implement any of the approaches described herein.

The controller 208 is configured to determine when the signal from the base station 214 (e.g., a GSM cellular base station) received at the antenna 216 and/or a location determination system 212 received at the antenna 202 fails to meet at least one predetermined criteria. When the signal fails to meet the at least one predetermined criteria, an emergency message is formed and presented to an operator of the vehicle at the presentation device 210.

The presentation device 210 may be any combination of audio presentation device (e.g., audio speakers, sirens, or other audio presentation devices) or visual presentation device (e.g., light emitting diodes (LEDs), conventional lights, any visual display screen (e.g., touch screens, liquid crystal displays and so forth)). Other examples of presentation devices are possible.

As mentioned, the presentation device 210 may be a separate device (or devices) that are coupled (e.g., via a wired or wireless connection) to the communication device. In other examples, the presentation device 210 is incorporated into the same housing as the other components of the apparatus 200. In this respect, space savings may be achieved and, in one example, an advantageous form factor (of the combined communication device and presentation device) is presented to a user.

Figure 3:
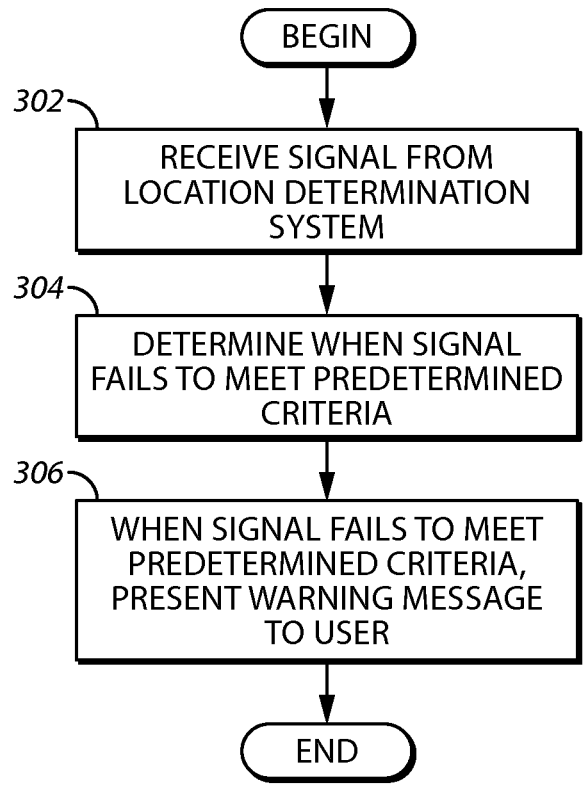
FIG. 3 comprises a flowchart of one example of an approach for alerting a user of a vehicle of the potential compromised/impaired performance of a tracking or security system according to various embodiments of the present invention.

Referring now to FIG. 3, one example of an approach for alerting a user of a vehicle to a potential compromise of a vehicular security or tracking system is described. At step 302, before a vehicle is parked (or at the occurrence of some other predetermined event); a signal is received from at least one of a base station and a location determination system. In one example, the location determination system is a satellite system. In other examples, the signal may be from a cellular or any other type of communication system.

At step 304, it is determined when the signal from the location determination system (or other type of communication system such as a cellular base station) fails to meet at least one predetermined criteria. As mentioned, various approaches or criteria may be used, for example, determining whether the signal quality or signal strength (e.g., as indicated by a received signal strength indicator (RSI)) meet a predetermined criteria.

At step 306, when the signal fails to meet the at least one predetermined criteria, an emergency message is formed and presented to an operator of the vehicle at a presentation device. As mentioned, various types and combinations of audio and visual presentation devices may be presented. Additionally, and also as mentioned, various types of messages with varying content may also be presented to the user/driver and to those in the vicinity of the vehicle.

Thus, approaches are provided where a user of a vehicle is presented with a warning when a vehicle tracking system may be potentially compromised. The approaches provided herein allow a user to avoid having their vehicle tracking and/or security system become compromised due to criminal or other activity. These approaches are easy to implement, easy to use, can be easily retrofitted into existing vehicles and systems, and are accurate at determining potentially compromising events that can be lead to the loss of the vehicle and/or its contents.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of warning of impaired performance of a vehicle tracking system in a poor communication area, the method comprising:

before a vehicle is parked, which is determined by monitoring movement of the vehicle:
receiving a signal by a communications device in the vehicle from at least one of: a location determination system and a base station;
determining by a controller coupled to the communications device when the received signal fails to meet at least one predetermined criteria;

when the received signal fails to meet the at least one predetermined criteria, providing a warning message to an operator of the vehicle on a presentation device, the message providing an instruction to move the vehicle to a second location having an improved signal quality.

2. The method of claim 1 wherein determining whether the signal fails to meet at least one predetermined criteria comprises determining when a received signal strength is below a predetermined level.

3. The method of claim 1 wherein determining whether the signal fails to meet at least one predetermined criteria comprises determining when a received signal quality fails to meet a predetermined quality level.

4. The method of claim 1 wherein determining whether the signal fails to meet at least one predetermined criteria comprises determining an existence of interference in the received signal.

5. The method of claim 1 wherein the signal is detected in a frequency band selected from the group consisting of the Global System for Mobile Communications (GSM) band and the Global Positioning Satellite (GPS) band.

6. The method of claim 1, wherein providing a warning message on a presentation device comprises: displaying a message on a display screen.

7. The method of claim 1, wherein providing a warning message on a presentation device comprises: providing an audio message.

8. The method of claim 1, further comprising: providing a location on the presentation device, whereat the received signal will have a known good signal quality.

9. An apparatus for detecting a theft or attempted theft of a vehicle in a poor communication area, the apparatus comprising:
a communications device in the vehicle;
a presentation device coupled to the communications device;
an antenna coupled to the communications device and configured to receive a signal from at least one of a base station and a location determination system; and
a controller coupled to the communications device, the controller configured to determine when the signal received at the antenna fails to meet at least one predetermined criteria, before the vehicle is parked which is determined by monitoring movement of the vehicle, and, when the signal fails to meet the at least one predetermined criteria, form and present an emergency message to an operator of the vehicle on the presentation device, the message on the presentation device instructing the vehicle operator to move the vehicle to another location having an improved signal quality.

10. The apparatus of claim 9 wherein the controller is configured to determine when a received signal strength is below a predetermined level.

11. The apparatus of claim 9 wherein the controller is configured to determine when a received signal quality fails to meet a predetermined quality level.

12. The apparatus of claim 9 wherein the controller is configured to determine an existence of interference in the received signal.

13. The apparatus of claim 9 wherein the signal is detected in a frequency band selected from the group consisting of the Global System for Mobile Communications (GSM) band and the Global Positioning Satellite (GPS) band.

14. The apparatus of claim 9 wherein the communications device is coupled to the vehicle and the presentation device is a display screen coupled to the vehicle.

15. The apparatus of claim 9, wherein the controller is configured to present an emergency message to an operator of the vehicle on the presentation device, the message on the presentation device instructing the vehicle operator to move the vehicle to a location where the received signal has a known good quality.

16. A non-transitory computer usable medium storing computer readable program code said computer readable program code adapted to be executed by a computer in order to implement a method of warning of impaired performance of a vehicle tracking system in a poor communication area, the method comprising:
before a vehicle is parked, which is determined by monitoring vehicle movement:
receiving a signal by a communications device in the vehicle from at least one of a location determination system and a base station;
determining by a controller coupled to the communications device when the received signal fails to meet at least one predetermined criteria;
when the received signal fails to meet the at least one predetermined criteria, presenting an emergency message to an operator of the vehicle on a presentation device, the message on the presentation device instructing the vehicle operator to move the vehicle to another location having an improved signal quality.

17. The computer usable medium of claim 16 wherein determining whether the received signal fails to meet at least one predetermined criteria comprises determining when a received signal strength is below a predetermined level and thereafter presenting the message on a display screen that is coupled to the vehicle.

* * * * *